United States Patent
Herchenreder et al.

(10) Patent No.: US 10,920,824 B2
(45) Date of Patent: Feb. 16, 2021

(54) SLIDING SUPPORT ASSEMBLY

(71) Applicant: Accuride International Limited, Northampton (GB)

(72) Inventors: Stefan Herchenreder, St. Neots (GB); Peter Bayles, Northampton (GB)

(73) Assignee: Accuride International Limited, Northamptonshire (GB)

( * ) Notice: Subject to any disclaimer, the term of this patent is extended or adjusted under 35 U.S.C. 154(b) by 0 days.

(21) Appl. No.: 16/343,662

(22) PCT Filed: Oct. 20, 2017

(86) PCT No.: PCT/GB2017/053183
§ 371 (c)(1),
(2) Date: Apr. 19, 2019

(87) PCT Pub. No.: WO2018/073607
PCT Pub. Date: Apr. 26, 2018

(65) Prior Publication Data
US 2020/0056656 A1    Feb. 20, 2020

(30) Foreign Application Priority Data

Oct. 21, 2016 (GB) .................... 1617870.9

(51) Int. Cl.
  *F16C 29/04* (2006.01)
  *F16C 39/02* (2006.01)
  *F16C 29/00* (2006.01)

(52) U.S. Cl.
  CPC .............. *F16C 29/04* (2013.01); *F16C 29/007* (2013.01); *F16C 39/02* (2013.01)

(58) Field of Classification Search
  CPC ........ F16C 29/007; F16C 29/02; F16C 29/04; F16C 39/02; A47B 88/04; A47B 88/00;
  (Continued)

(56) References Cited

U.S. PATENT DOCUMENTS 3,371,968 A * 3/1968 Loake .................. A47B 88/493
                                                         384/18
5,011,300 A    4/1991 Teramachi
(Continued)

FOREIGN PATENT DOCUMENTS

DE     102012111943 A1    6/2014
EP         1614915 A2     1/2006
JP         2003326430 A  11/2003

OTHER PUBLICATIONS

Chinese Patent Office. First Office Action from corresponding CN Application No. 201780065069.4, dated Apr. 2, 2020.
(Continued)

*Primary Examiner* — Alan B Waits
(74) *Attorney, Agent, or Firm* — Brian B. Shaw, Esq.; Alfred Y. Chu, Esq.; Harter Secrest & Emery LLP (57) ABSTRACT

The application discloses sliding support assemblies which allow for relative linear motion between two bodies. The sliding support assemblies include a rolling slide mechanism and a friction slide mechanism. The rolling slide mechanism provides a low resistance to sliding motion between the two bodies. The friction slide mechanism provides support to the sliding support assembly when the loading between the two bodies is increased.

17 Claims, 11 Drawing Sheets

(58) Field of Classification Search
CPC ..... A47B 88/483; A47B 88/40; A47B 88/497; A47B 88/487; A47B 88/437; A47B 88/49; A47B 88/493; A47B 2210/0032; A47B 2210/0035; A47B 2210/0037; A47B 2210/004; B60N 2/773; B60N 2/753; H05K 7/1489

See application file for complete search history.

(56) References Cited

U.S. PATENT DOCUMENTS

| | | | | |
|---|---|---|---|---|
| 5,273,364 | A * | 12/1993 | Hara | B23Q 1/58 384/45 |
| 5,281,029 | A | 1/1994 | Morita | |
| 7,364,245 | B2 * | 4/2008 | Dubon | A47B 88/49 312/333 |
| 2010/0226080 | A1 * | 9/2010 | Tsuchida | H04M 1/0237 361/679.01 |
| 2013/0146396 | A1 * | 6/2013 | Miwa | F16C 29/02 187/230 |

OTHER PUBLICATIONS

International Search Report and Written Opinion of PCT/GB2017/053183 of the International Searching Authority completed Jan. 12, 2018 (10 pages).
China National Intellectual Property Administration (CNIPA), Office Action from corresponding Chinese Patent Application No. 2017-80065069.4 (Pub. No. CN 110100107A), dated Nov. 2, 2020.

* cited by examiner

SLIDING SUPPORT ASSEMBLY

FIELD OF THE INVENTION

The invention relates to sliding support assemblies which allow for relative linear motion between two bodies.

BACKGROUND OF THE INVENTION

Ball bearing slides are low friction in use, even under load and, as a beam, they are stiff in the orientation that they are normally used in, i.e. the deflection is relatively low when loaded in the direction of largest moment of inertia. However, in the lateral direction or in a twisting direction they are much less stiff.

Friction slides, or linear plain bearings, have one or more bearing surfaces and no rolling elements. Frictions slides which have an outer track with perhaps a solid low friction moving element inside it acting as the inner member, can be made to be stiff in all directions. However, their movement force is high when they are loaded; much higher than an equivalent rolling ball slide. For many applications (e.g. automotive) rattle is unacceptable. This means that in these circumstances the friction slide typically needs to have a very close or tight fit between the sliding components. This inevitably leads to a high force required to move the slide, and also a corresponding high variation in the force required to move the slide due to manufacturing restrictions on tolerances.

For many applications it is advantageous to have a high beam stiffness in any direction, but a low movement force when not significantly loaded. In order for a ball bearing slide to have a higher stiffness, additional material is required, which results in an increase to the moment of inertia of the slide. If a friction slide is used as an alternative, either the user has to apply a large force to move the slide or a stronger and heavier actuator is required.

SUMMARY OF THE INVENTION

According to the invention there is provided a sliding support assembly comprising a first body and a second body. The first body is slidable relative to the second body in a longitudinal direction. The sliding support assembly comprises a rolling slide mechanism and a friction slide mechanism. The rolling slide mechanism comprises a rail of channel section associated with the first body, a slide member associated with the second body, the slide member slidable in the longitudinal direction within the channel defined by the rail, and a locating means comprising rotatable bearings configured to locate and align the slide member within the channel. The friction slide mechanism comprises a friction slide member associated with one of the first body or the second body, and a friction slide channel associated with the other of the first or second body, wherein the friction slide member is configured to slide in the longitudinal direction within the friction slide channel.

The rotatable bearings are preferably bearing balls. The friction slide member and/or the friction slide channel may comprise a low friction material. The friction slide channel and/or the friction slide member may be formed from a low friction material or comprise a low friction material coating or lining.

The sliding support assembly may further comprise a low friction material insert coupled to the friction slide channel and/or the friction slide member. The low friction material insert may be biased to engage the friction slide channel and the friction slide member. The low friction material insert may comprise an elastic material and be shaped to flex towards a position where the low friction material insert is in contact with the friction slide channel and the friction slide member.

The sliding support assembly may further comprise a biasing member which biases the low friction material insert into contact with the friction slide channel and/or the friction slide member. The biasing member may be one of a helical spring, a leaf spring, or a deformable elastic member.

Preferably the low friction material is a polymer. In particular, the polymer may be selected from the list of: POM, Nylon, PEEK, PTFE, or UHMWPE. The polymer may be a reinforced composite, such as POM reinforced with PTFE.

The friction slide member may comprise an L-shaped cross-section, a rectangular cross-section, a round cross-section, or a dovetail.

The low friction material may extend for substantially the entire length of the friction slide member and/or substantially the entire length of the friction slide channel. Alternatively, the low friction material may extend a portion of the length of the friction slide member and/or the friction slide channel.

The friction slide member may comprise a low friction material which is disposed at one end of the friction slide member, and the friction slide channel may comprise a low friction material which is disposed at the opposing end of the friction slide channel.

The sliding support assembly may comprise a plurality of rolling slide mechanisms, each rolling slide mechanism comprising: a rail of channel section associated with the first body, a slide member associated with the second body, the slide member slidable in the longitudinal direction within the channel defined by the rail, and a locating means comprising rotatable bearings configured to locate and align the slide member within the channel.

The sliding support assembly may comprise a plurality of friction slide mechanisms, each friction slide mechanism comprising: a friction slide member associated with one of the first body or the second body, and a friction slide channel associated with the other of the first or second body, wherein the friction slide member is configured to slide in the longitudinal direction within the friction slide channel.

At least one of the plurality of rolling slide mechanisms may be arranged in a first plane, and at least one of the plurality of rolling slide mechanisms arranged in a second plane.

At least one of the plurality of friction slide mechanisms may be arranged in a first plane, and at least one of the plurality of friction slide mechanisms arranged in a second plane.

At least one of the plurality of rolling slide mechanisms may be arranged in a first plane, and at least one of the plurality of friction slide mechanisms arranged in a second plane.

The first plane may be parallel to the second plane, or the first plane may be perpendicular to the second plane.

The first body and/or the second body may comprise an L-shaped, a U-shaped, or a rectangular shaped cross section.

The plurality of friction slide mechanisms may comprise a first friction slide mechanism arranged on a first side of the rolling slide mechanism and a second friction slide mechanism arranged on a second side of the rolling slide mechanism.

The plurality of rolling slide mechanisms may comprise a first rolling slide mechanism arranged on a first side of the friction slide mechanism and a second rolling slide mechanism arranged on a second side of the friction slide mechanism.

The friction slide mechanism may be configured to support the rolling slide mechanism under one or more of, a torsional load, a bending load out of a plane defined by the first body, a bending load out of a plane defined by the second body, a bending load in a plane defined by the first body, and a bending load in a plane defined by the second body.

The sliding support assembly may be configured to support an armrest.

The sliding support assembly may further comprise a stop configured to prevent over extension of the sliding support assembly. The stop may be one of a mechanical or an electrical stop. The stop may act upon the rolling slide mechanism, the friction slide mechanism, or another part of the sliding support assembly.

Preferably, the friction slide channel engages the friction slide member to resist or limit separation of the first and second bodies.

The friction slide channel may engage the friction slide member to resist or limit relative displacement between the first and second bodies in a direction perpendicular to the longitudinal direction.

The friction slide channel may engage the friction slide member to resist or limit relative displacement between the first and second bodies in all directions perpendicular to the longitudinal direction.

The sliding support assembly may further comprise a biasing means which is configured to maintain a position of the friction slide member relative to the friction slide channel. The biasing means may comprise a portion of a low friction material insert. The low friction material insert may comprise: a web, a first flange extending from the web, and a second flange extending from the web.

The first flange of the low friction material insert may extend perpendicularly from the web and the second flange of the low friction material insert may extend from the web at an angle relative to the first flange, such that in use, the low friction material insert provides resilience against movement of the first body relative the second body in a direction perpendicular to the longitudinal direction.

The friction slide mechanism may be adjacent to and separated from the rolling slide mechanism.

The friction slide mechanism may be arranged within the rail of the rolling slide mechanism.

The friction slide mechanism may be a first friction slide mechanism and the sliding support assembly may further comprise a second friction slide mechanism arranged within the rail of the rolling slide mechanism. The first friction slide member may extend laterally in the cross direction and the second friction slide member may extend laterally opposed to the first friction slide member.

The rail of channel section may comprise a web, a first wall extending from the web and a second wall extending from the web. The friction slide mechanism may be arranged on the web within the channel, between the first and second walls.

The friction slide member may comprise a plurality of contact surfaces configured to engage the friction slide channel. Preferably, the plurality of contact surfaces may comprise three or four contact surfaces. The friction slide member may comprise: a first contact surface, a second contact surface perpendicular to the first contact surface, and a third contact surface parallel to the first contact surface. The friction slide member may further comprise a fourth contact surface parallel to the second contact surface. The plurality of contact surfaces may be configured to engage corresponding surfaces of the friction slide channel.

The rail of the rolling slide mechanism may be integrally formed as part of the first body or may be formed separately and fixed to the first body. The friction slide component associated with the first body (either the friction slide member or the friction slide channel) may be integrally formed as part of the first body or may be formed separately and fixed to the first body.

The slide member of the rolling slide mechanism may be integrally formed as part of the second body or may be formed separately and fixed to the second body. The friction slide component associated with the second body (either the friction slide member or the friction slide channel) may be integrally formed as part of the second body or may be formed separately and fixed to the first body.

In one example, the rail is integrally formed with the first body and the friction slide channel is formed separately before being fixed to the first body. In another example both the rail and the slide member are formed separately from the first body before being fixed to the first body. In yet another example, the friction slide member is formed separately and then fixed to the first body, whilst the friction slide channel is associated with the second body. Of course, any arrangement of the rail, the slide member, the friction slide member and the friction slide channel formed integrally with or fixed to the first or second body is within the scope of the disclosure.

The first body and/or the second body may be formed from, for example, rolled steel or extruded material, such as extruded aluminium. The rail, slide member, friction slide channel and/or friction slide member may be formed separately from the first and second bodies from, for example, rolled steel or extruded material, such as extruded aluminium.

Components formed separately from the first and second bodies may be fixed to the first or second bodies by any appropriate attachment means, such as welding, bolts, screws or other mechanical fixings.

DETAILED DESCRIPTION

Figure 1:
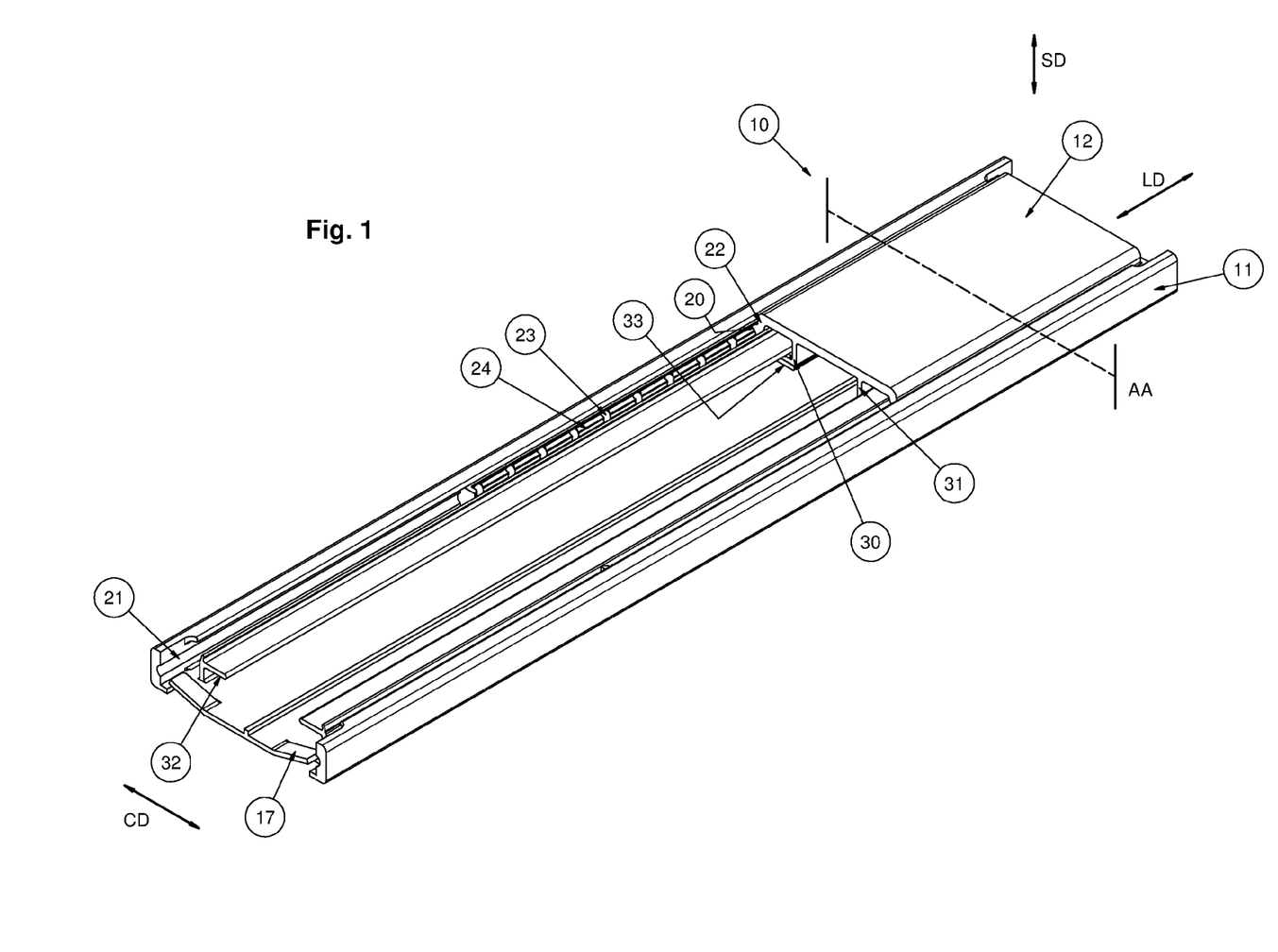
FIG. 1 shows an isometric view of a sliding support assembly according to a first embodiment.
Figure 2:
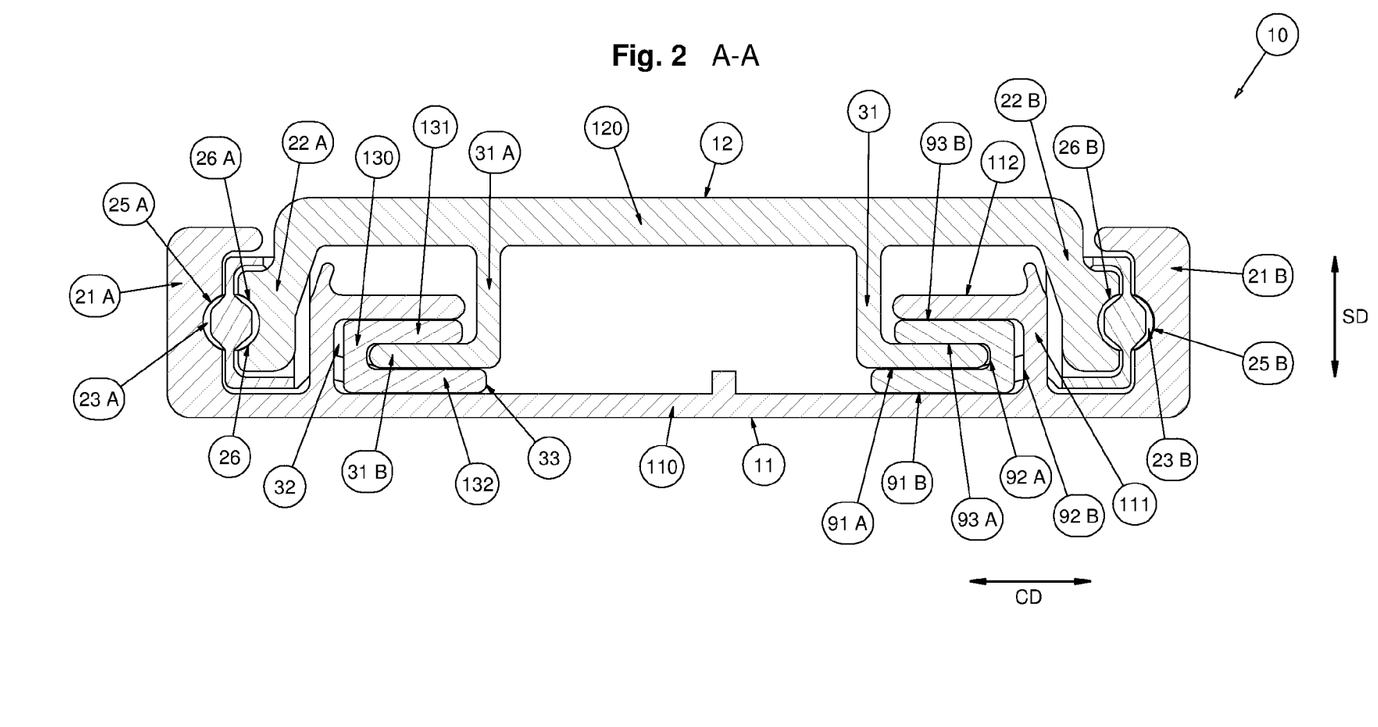
FIG. 2 shows a cross section through section A-A of the sliding support assembly 10 in FIG. 1.
Figure 3:
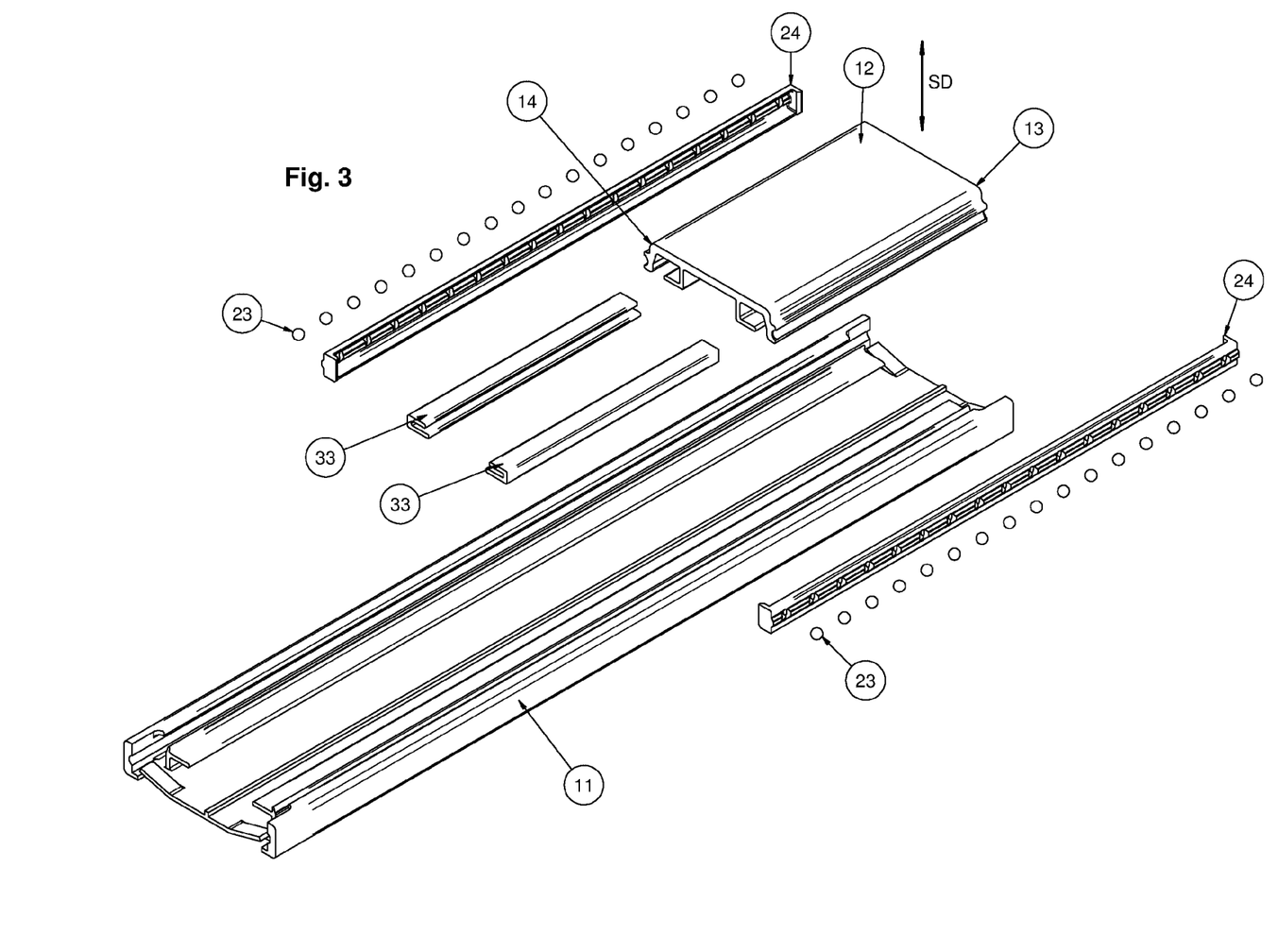
FIG. 3 shows an exploded assembly view of the sliding support assembly 10 in FIG. 1.

FIGS. 1 to 3 show various views of a sliding support assembly 10 according to a first embodiment of the present invention. The sliding support assembly includes a first body 11 and a second body 12. The first body 11 and the second body 12 are formed from extruded material, such as extruded aluminium. The first body 11 is slidable along a longitudinal direction LD relative to the second body 12. The sliding support assembly comprises a rolling slide mechanism 20 and two friction slide mechanisms 30.

The rolling slide mechanism 20 comprises a rail 21 of channel section which is associated with the first body 11. The rail 21 is integrally formed with the first body 11 and comprises a web 110 and first and second flanges 21A, 21B which together define the channel section of the rail 21. The rolling slide mechanism 20 also comprises a rolling slide member 22 associated with the second body 12. The rolling slide member 22 is integrally formed with the second body 12 and comprises a web 120 and flanges 22A, 22B. The rolling slide member 22 extends into the channel defined by the rail 21 permitting the rolling slide member 22 to slide in the longitudinal direction LD within the channel. The rolling slide mechanism 20 also comprises a locating means 23 which comprises rotatable bearings configured to locate and align the rolling slide member 22 within the channel. The rotatable bearings comprise a plurality of bearing balls 23 in rolling contact with the rail 21 and the rolling slide member 22. The flanges 21A, 21B each comprise a race 25A, 25B and corresponding flanges 22A, 22B each comprise a corresponding race 26A, 26B. A first plurality of the bearing balls 23A are located within the races 25A and 26A between the corresponding flanges 21A and 22A. A second plurality of the bearing balls 23B are located within the races 25B and 26B between the corresponding flanges 21B and 22B. The bearing balls 23A, 23B are supported by cages 24 which support the bearing balls 23 and keep them spaced at a regular distance. The cages 24 also keep the bearing balls 23 in position when they are not engaged by both the rolling slide member 22 and the rail 21. At the end of the sliding support assembly 10, there is a stop 17, which prevents the first body 11 and the second body 12 from detaching by overextending. The stop 17 is a mechanical stop which physically prevents the sliding support assembly from overextending. Alternatively or additionally, the stop may comprise an electrical stop. At the maximum level of desired travel of the sliding support assembly, an electrical stop sends a signal to a controller indicating that the sliding support assembly is at the end of its travel.

Each friction slide mechanism 30 comprises a friction slide member 31 associated with the second body 12 and a friction slide channel 32 associated with the first body 11. The friction slide member 31 is integrally formed with the second body 12 and the friction slide channel 32 is integrally formed with the first body 11. The friction slide member 31 extends from the second body 12 into the friction slide channel 32 such that the friction slide member 31 is slidable relative to the friction slide channel 32 along a longitudinal direction LD of the sliding support assembly 10. The friction slide mechanism 30 comprises a low friction material configured to facilitate a low-friction sliding engagement between the friction slide member 31 and the friction slide channel 32. The low friction material is provided as a low friction material insert 33 which is configured to mate the friction slide member 31 with the friction slide channel 32. The low friction material insert 33 is fixed to the friction slide member 31, and provides a low friction interface or mate with the friction slide channel 32. The low friction material insert 33 may be formed from a low friction polymer such as Polyoxymethylene (POM), Polyether ether ketone (PEEK), Ultra high molecular weight polyethylene (UHMWPE), Nylon, or Polytetrafluoroethylene (PTFE). The low friction polymer may be a single material or a composite material, for example a matrix of POM reinforced by fibres of PTFE. The low friction polymer may include other fillers, for example oil.

The friction slide member 31 comprises a wall 31A which extends away from the second body 12 towards the first body 11, and a lateral flange 31B which extends substantially perpendicular to the wall 31A, such that the sectional shape of the friction slide member 31 is L-shaped. The friction slide channel 32 comprises a complementary cross sectional shape which engages the friction slide member 31. The friction slide channel 32 is formed by a portion of the web 110, a first wall 111 which extends substantially perpendicular to the web 110 and a lateral wall 112 which extends substantially perpendicular to the first wall. The lateral flange 31B of the friction slide member extends laterally within the friction slide channel 32 between the lateral wall 112 and the web 110 of the first body 11. The engagement of the friction slide member 31 with the complementary cross sectional shape of the friction slide channel 32 allows the friction slide mechanism 30 to transmit a force in the separation direction SD from the first body 11 to the second body 12 and allows the friction slide mechanism 30 to resist torsional or linear forces which would tend to cause the second body 12 to separate from the first body 11, or move relative to the first body in a direction perpendicular to the longitudinal direction LD.

The friction slide member 31 comprises a first contact surface 91A, a second contact surface 92A, and a third contact surface 93A. Each of the contact surfaces 91A, 92A, 93A is configured to engage a corresponding complementary surface 91B, 92B, 93B of the friction slide channel 32 under certain load conditions. As best seen in FIG. 2, the contact faces 91A, 92A, 93A engage the corresponding surfaces 91B, 92B, 93B of the friction slide channel 32 with the low friction material insert 33 therebetween. The first contact surface 91A faces the web 110 of the first body 11 and is arranged to engage the friction slide channel 32 to resist motion of the second body 12 towards the first body 11 in the separation direction SD. The second contact surface 92A is substantially perpendicular to the first contact surface and is arranged to engage the friction slide channel 32 to resist relative motion of the second body 12 to the first body 11 in the lateral or cross direction CD. The third contact surface 93A faces the web 120 of the second body 12 and is arranged to engage the friction slide channel 32 to resist relative motion of the second body 12 away from the first body 11.

The low friction material insert 33 is fixed to the friction slide member 31 and extends along the length of the friction slide member 31 from a first end 13 to a second end 14 of the second body 12. The low friction material insert 33 is fixed to the friction slide member by an interference fit with the friction slide member. The low friction material insert 33 may alternatively or additionally be secured to the friction slide member 31 by use of, for example, mechanical fasteners or an adhesive attachment. The low friction material insert 33 comprises a web 130, a first flange 131 extending from the web 130, and a second flange 132 extending from the web 130. The low friction material insert 33 partially surrounds the friction slide member 31.

Figure 4:
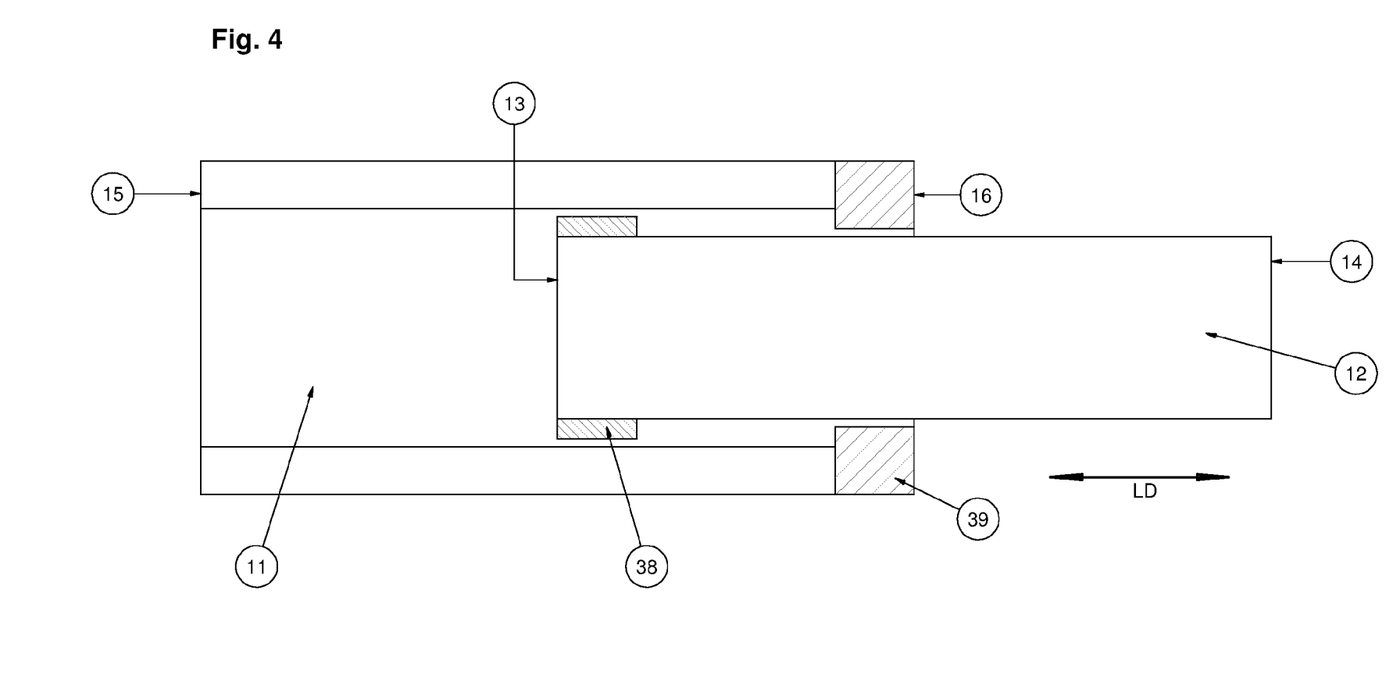
FIG. 4 shows a detail view of a sliding support assembly according to another embodiment.

Alternatively, as shown in FIG. 4, both the friction slide member 31 and the friction slide channel 32 include a portion of low friction material. Each portion of low friction material may form a portion of the channel or member, be a lining of the channel or member, or may be a low friction material insert 33. A first portion of low friction material 38 is attached to the second body 12 and a second portion of low friction material 39 is attached to the first body 11. The first portion of low friction material 38 partially extends along the friction slide member 31, and is located towards or at the first end 13 of the second body 12. The second portion of low friction material 39 partially extends along the friction slide channel 32, and is located towards or at the second end 16 of the first body 11. In this way, when the first end 13 of the second body 12 and the first end 15 of the first body 11 are aligned, the first portion of low friction material 38 supports the first body 11 relative to the second body 12 at one end of the sliding support assembly 10, and the second portion of low friction material 39 supports the first body 11 relative to the second body 12 at a position further along or at the other end of the sliding support assembly 10. The position of the two bodies shown in FIG. 4 is at a point where the sliding support assembly has been at least partially extended.

The sliding support assembly shown in FIGS. 1 to 3 comprises two friction slide mechanisms 30 which are arranged within the channel section of the rail of the rolling slide mechanism 20. The friction slide member of the first friction slide mechanism comprises a wall 31A and a laterally extending member 31B. The laterally extending member 31B of the first friction slide mechanism extends in the cross direction CD. The friction slide member of the second friction slide mechanism also comprises a wall 31A and a laterally extending member 31B. The laterally extending member of the second friction slide member also extends in the cross direction CD and laterally opposed to the laterally extending member of the first friction slide mechanism. In this way, the second contact surface 92A of the first friction slide mechanism supports the second body against movement one way in the cross direction, and the second contact surface 92A of the second friction slide mechanism supports the second body against movement in the opposite direction. Alternatively or additionally, the sliding support assembly 10 may comprise friction slide mechanisms 30 which are arranged adjacent to and separated from the rolling slide mechanism 20.

Figure 5:
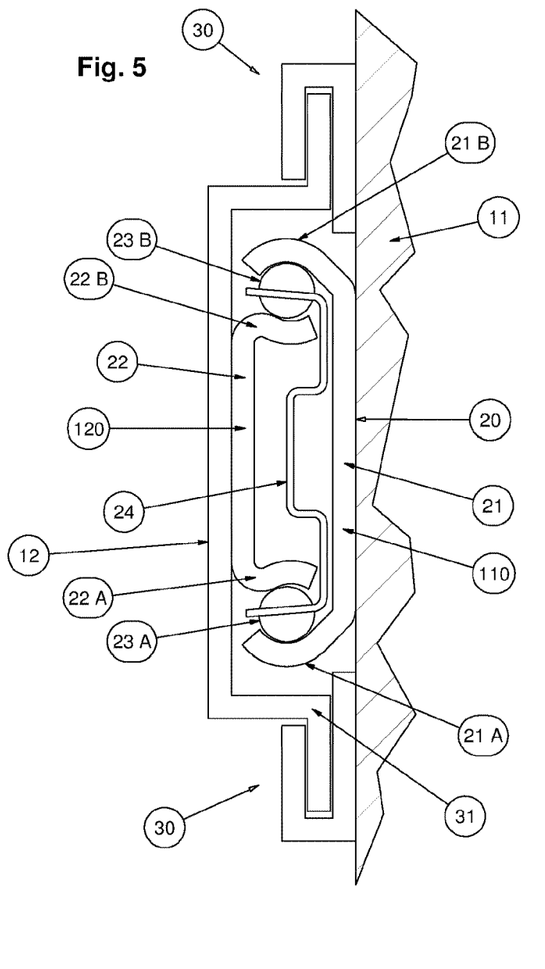
FIGS. 5, 5A, and 5B show detail views of friction slide members according to further embodiments.

The sliding support assembly 10 shown in FIG. 5 comprises two friction slide mechanisms 30 which are arranged adjacent to and separated from the rolling slide mechanism 20. The two friction slide mechanisms 30 are arranged on opposite sides of the rolling slide mechanism 20. The friction slide mechanisms 30 of the sliding support assembly 10 of FIG. 5 each comprise an L-shaped cross section. The rail 21 of channel section of the rolling slide mechanism 20 comprises a web 110 and two flanges 21A, 21B. The rail 21 is formed separately from the first body 11 and is connected to the first body 11 by means for attachment such as mechanical fasteners or welding. The rolling slide member 22 comprises a web 120 and two flanges 22A, 22B. The rolling slide member is formed separately from the second body and is connected to the first body by means for attachment such as mechanical fasteners or welding. A single cage 24 supports the bearing balls 23A between flange 21A and flange 22A and the bearing balls 23B between flange 21B and flange 22B.

The friction slide member 31 may be of any suitable cross-section for the purpose of supporting the sliding support assembly 10. As described above, the friction slide member 31 shown in FIGS. 1 to 3 and in FIG. 5 comprises an L-shaped cross section with a wall 31A which extends substantially perpendicularly away from the second body 12 towards the first body 11, and a lateral flange 31B which extends substantially perpendicular to the wall 31A and perpendicular to the separation direction SD. However, the friction slide member may comprise any suitable cross-sectional shape and, for example, the wall 31A and/or lateral flange 31B of the friction slide member may extend at any suitable acute or obtuse angle to the separation direction SD and/or each other. A contact surface of the lateral flange 31B of the friction slide member 31 of FIGS. 1 to 3 is arranged to engage with a contact surface on the lateral wall 112 of the friction slide channel 32 which is substantially perpendicular to the separation direction. However, contact surfaces of the friction slide channel and the friction slide member may alternatively or additionally be arranged in other planes which are perpendicular to the longitudinal direction. For example, a wall of the friction slide member may extend in a direction which is perpendicular to the longitudinal direction but angled at, for example, between 0 and 60 degrees, or 10 and 50 degrees, or 20 and 40 degrees, or 45 degrees relative to the separation direction SD. Moreover, a lateral flange of the friction slide member may extend in a direction which is perpendicular to the longitudinal direction but angled at, for example, between 30 and 90 degrees, or 40 and 80 degrees, or 50 and 70 degrees, or 45 degrees relative to the separation direction SD.

Figure 5A:
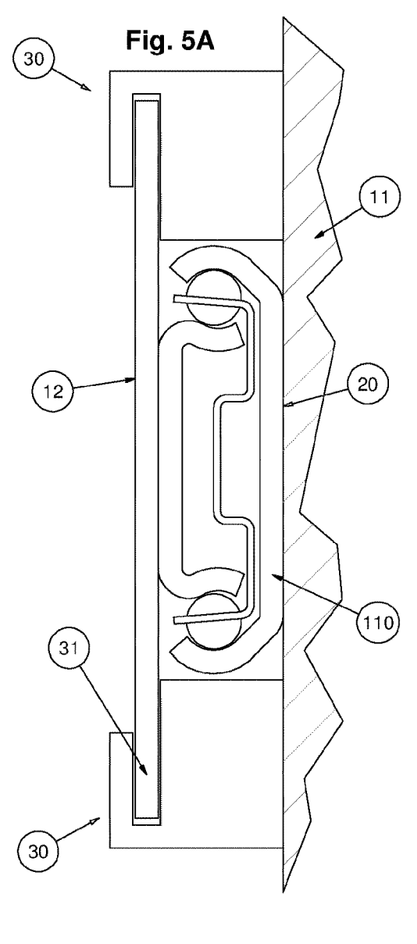
Figure 5B:
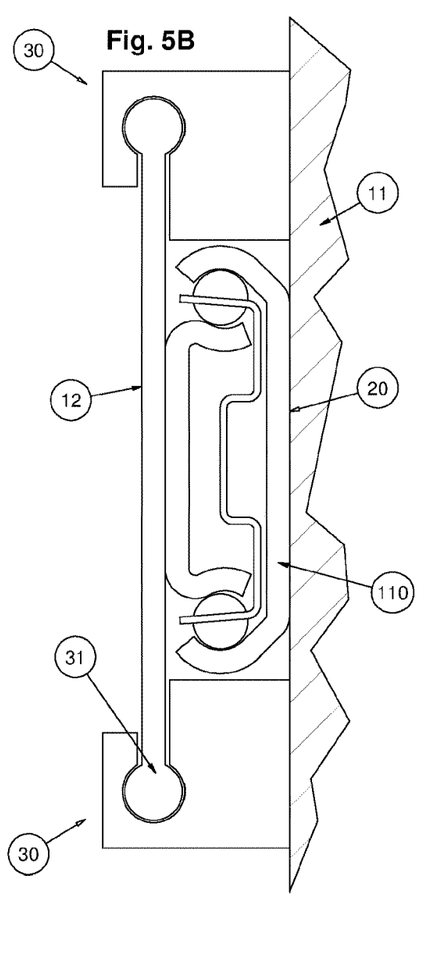

As another example, the friction slide member 31 shown in FIG. 5A comprises a flange of rectangular cross section which extends laterally into the friction slide channel 32. As another example, the friction slide member 31 shown in FIG. 5B has a convex or bulbous cross section, such as a round cross section, which extends into and is partially surrounded by the friction slide channel 32. The friction slide member 31 may include a dovetail connection or a T-shaped cross section which extends into and is at least partially surrounded by the friction slide channel 32. The friction slide channel 32 comprises a corresponding and complementary cross sectional shape to accommodate and engage the friction slide member 31.

Figure 6:
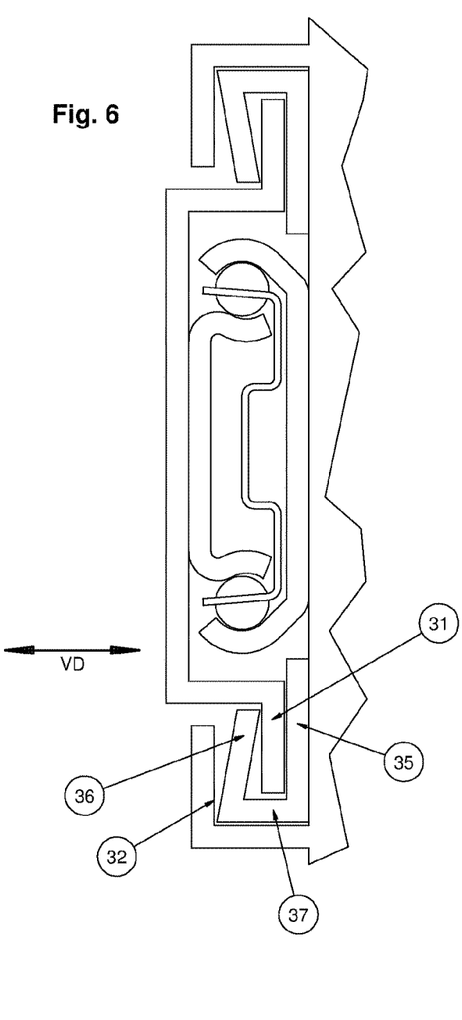
FIG. 6 shows a detail view of a low friction material insert according to another embodiment.

The low friction material insert 33 shown in FIG. 6 is configured to provide a degree of flexibility. The low friction material insert 33 is fixed to the friction slide channel 32 and comprises a first flange 35, a second flange 36, and a base 37. The first flange 35 and the base 37 are arranged to lay flat against the surface of the friction slide channel 32. The second flange 36 extends at an angle away from the surface of the friction slide channel 32 such that the second flange 36 is resiliently biased towards the friction slide member 31, forming biasing means. Resilient bias may also be achieved by, for example, a curve or lip on the second flange 36 or spring-loading of the low friction material insert.

Due to manufacturing tolerances, a gap would typically exist between the friction slide member 31 and the friction slide channel 32. This gap could result in rattle in the slide due to unrestrained relative movement of the first 11 and second 12 bodies in directions other than the longitudinal direction. In use, the biasing means absorbs some relative movement of the friction slide member 31 within the friction slide channel 32 and reduces or prevents rattle or unrestrained movement of the first 11 and second 12 bodies relative to one another, whilst allowing the friction slide member 31 to slide within the friction slide channel 32 in the longitudinal direction LD. In use, when the assembly is not carrying significant load, the biasing means provides only a low contact force (light contact or no contact) between the friction slide channel 32 and the friction slide member 31. The low contact force allows low friction sliding of the mechanism in the longitudinal direction. When the assembly is carrying significant load, the first and second bodies experience a small relative movement which closes the gap between the friction slide member 31 and the friction slide channel 32 (overcoming any biasing force provided by the biasing means). Under significant load, the friction slide mechanism provides a large contact force between the friction slide member and the friction slide channel, imparting stiffness to the sliding support assembly. Therefore, the sliding support assembly typically slides freely in the longitudinal direction due to the low contact force of the biasing means, but has a high perceived stiffness when under load.

Figure 7A:
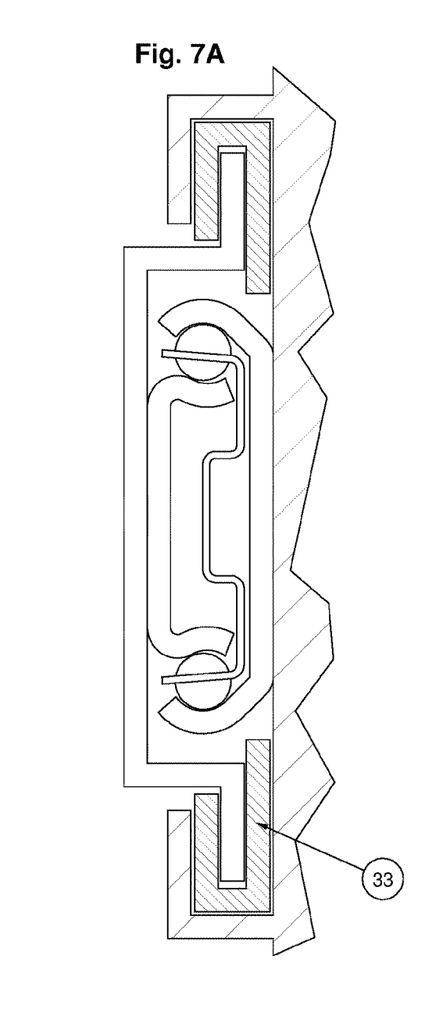
FIGS. 7A, 7B, and 7C show detail views of low friction material in a friction slide mechanism according to further embodiments.
Figure 7B:
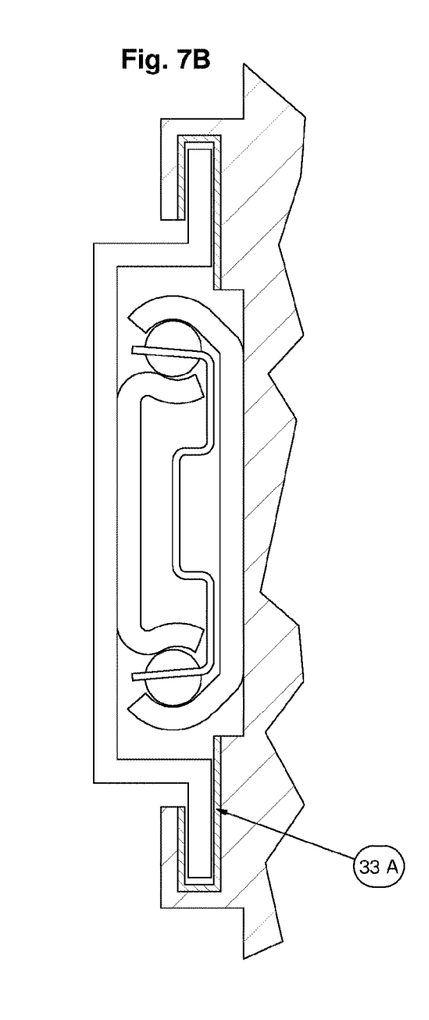
Figure 7C:
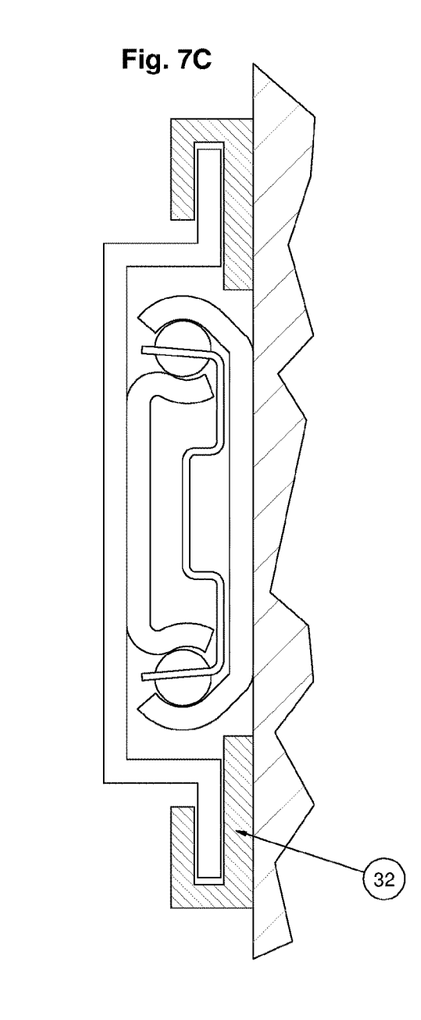

The low friction material insert 33 of the sliding support assembly of FIGS. 1 to 3 is a separate component which has been fixed to the friction slide member 31. The low friction material insert 33 of the sliding support assembly of FIG. 6 is a separate component which has been fixed to the friction slide channel 32. Alternatively, the low friction material may be a coating, layer or lining 33A of the friction slide channel as shown in FIG. 7B, or the friction slide channel 32 itself may be formed of a low friction material, as shown in FIG. 7C.

Figure 8:
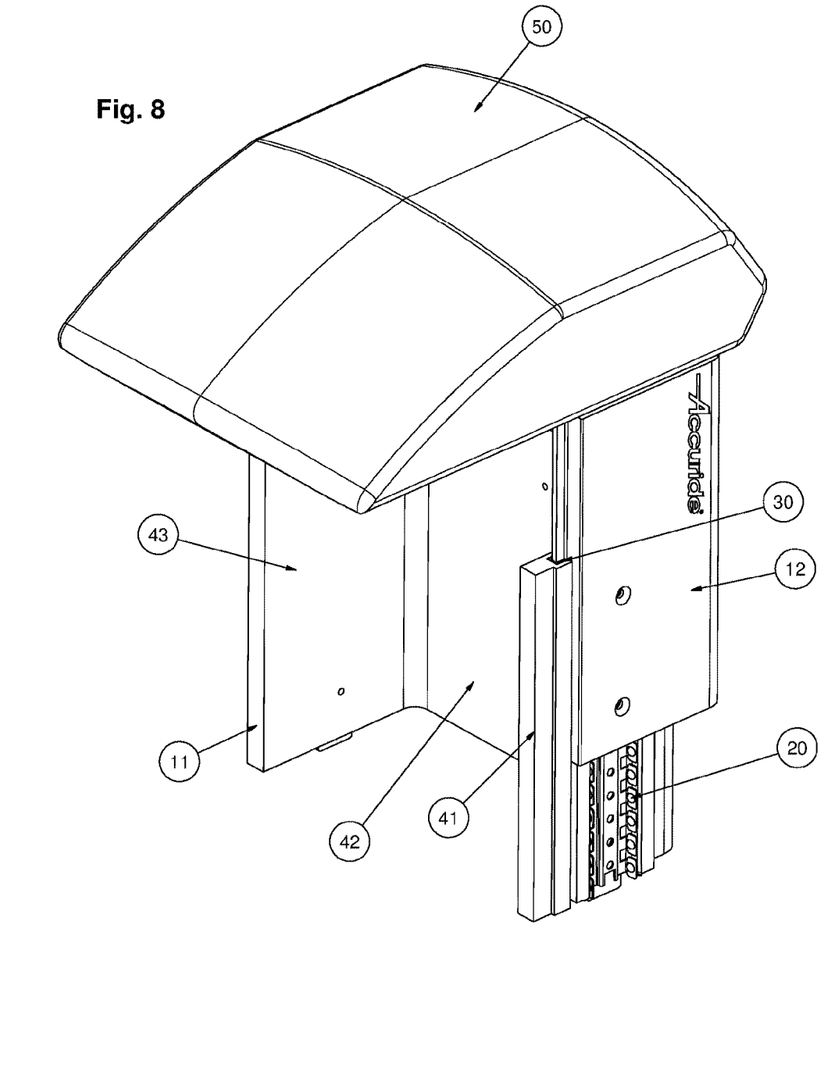
FIG. 8 shows an isometric view of a sliding support assembly according to another embodiment including an armrest.
Figure 9A:
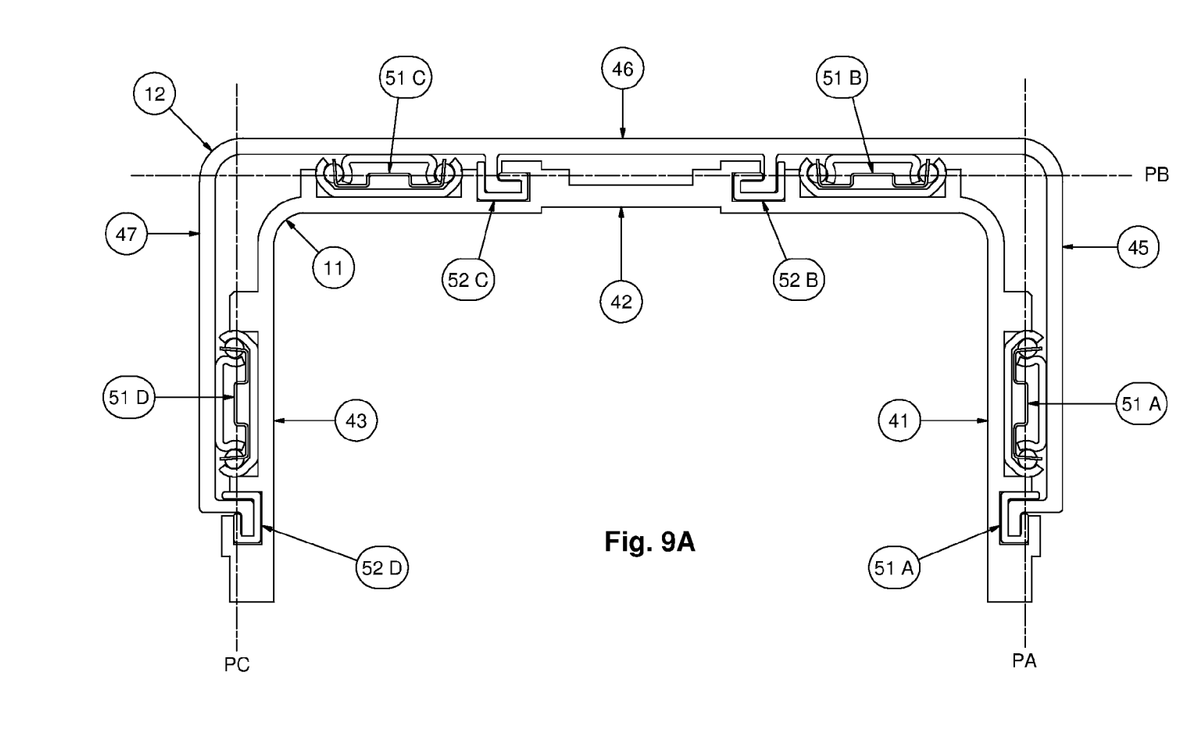
FIGS. 9A, 9B, and 9C show detail views of sliding support assemblies according to further embodiments.
Figure 9B:
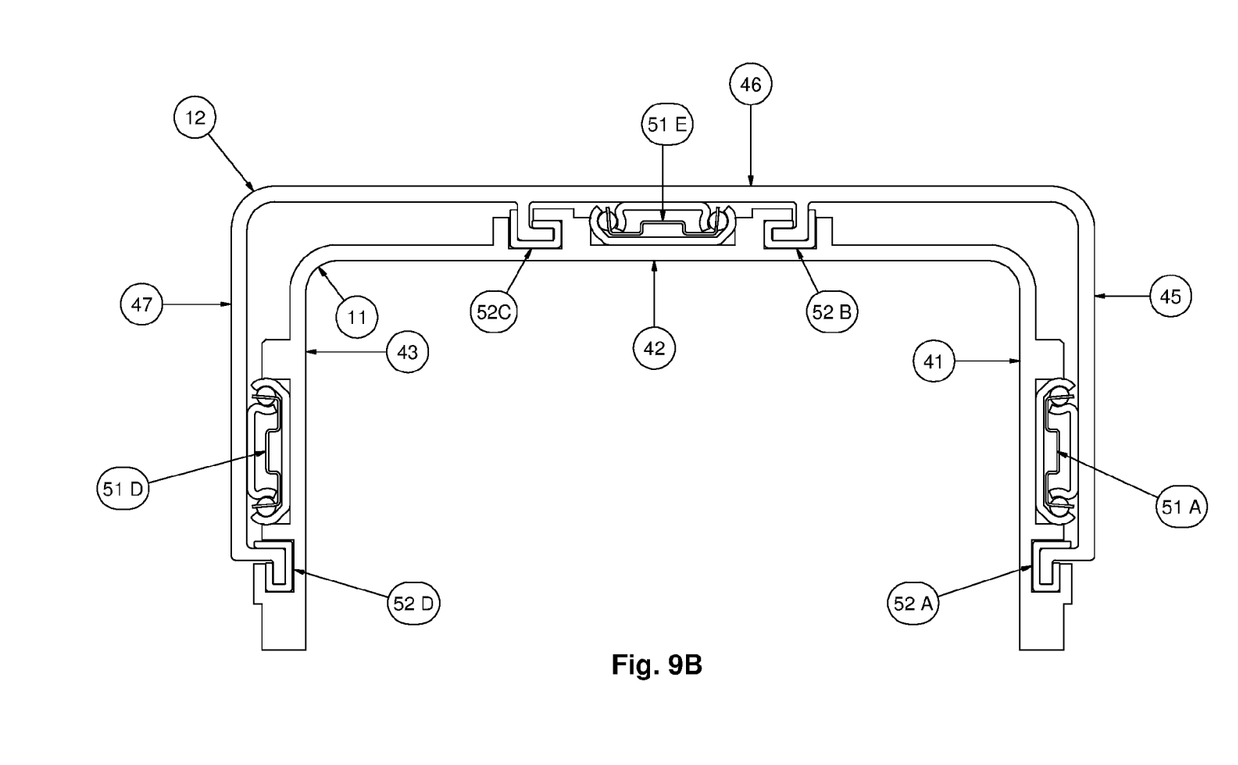
Figure 9C:
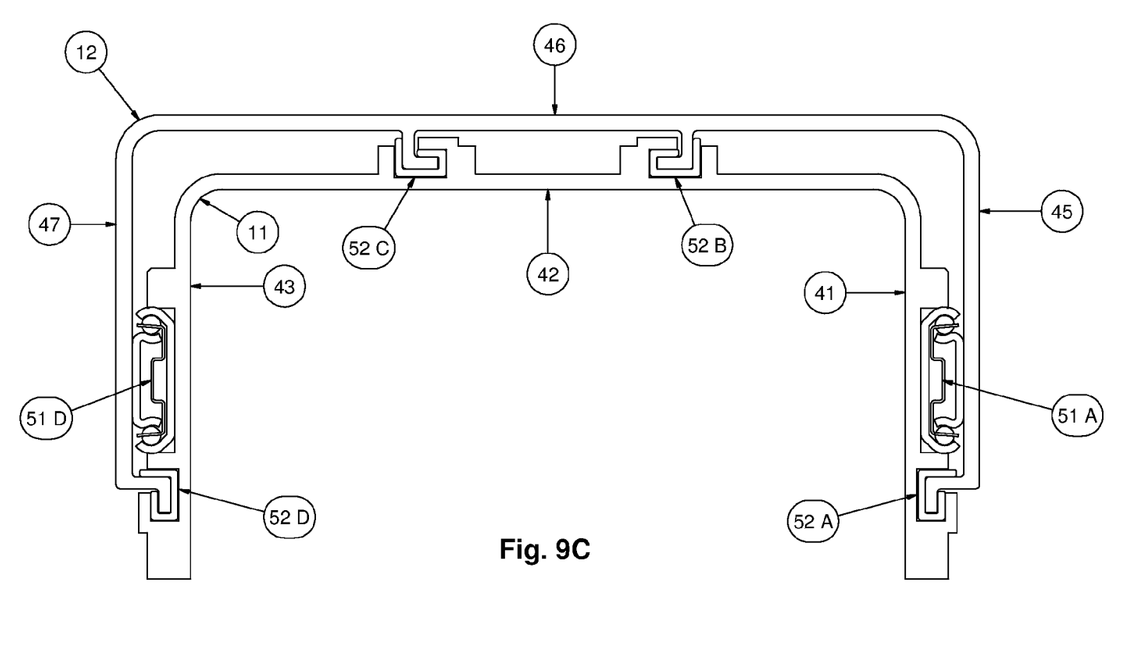

In the sliding support assemblies shown in FIGS. 8 and 9, the first body 11 comprises a plurality of walls and the second body 12 comprises a plurality of walls which correspond to the walls of the first body.

The sliding support assembly shown in FIG. 9A is arranged in a U shaped cross section. The U shape is defined by first 41, second 42, and third 43 walls of the first body 11, and complementary first 45, second 46, and third 47 walls of the second body 12. Each pair of first walls 41, 45, second walls 42, 46, and third walls 43, 47, are substantially planar and are arranged parallel to first PA, second PB, and third PC planes respectively. The first plane PA is perpendicular to the second plane PB. The third plane PC is also perpendicular to the second plane PB and offset from the first plane PA. A first friction slide mechanism 52a, and a first 51a rolling slide mechanism are arranged between the first wall 41 of the first body 11 and the first wall 45 of the second body 12, substantially in the first plane PA. Second 52b and third 52c friction slide mechanisms, and second 51b, and third 51c rolling slide mechanisms are arranged between the second wall 42 of the first body 11 and the second wall 46 of the second body 12, substantially in the second plane. A fourth 52d friction slide mechanism, and a fourth 51d rolling slide mechanism are arranged between the third wall 43 of the first body 11 and the third wall 47 of the second body 12, substantially in the third plane PC.

The sliding support mechanism shown in FIG. 9C is substantially similar to that of FIG. 9A. However, in the arrangement of FIG. 9C, the second and third rolling slide mechanisms are not present.

The sliding support mechanism shown in FIG. 9B is substantially similar to that of FIG. 9C. However, in the arrangement of FIG. 9B, an additional fifth 51e rolling slide mechanism is arranged between the second wall 42 of the first body and the second wall 46 of the second body, and between the second 52b and third 52c friction slide mechanisms.

Alternatively, the first and/or second body may comprise an L-shape cross section. A first body with an L-shaped cross section may be formed substantially as illustrated in any one of FIGS. 9A to 9C with either the first wall 41 or third wall 43 omitted. A second body with an L-shaped cross section may be formed substantially as illustrated in any one of FIGS. 9A to 9C with either the first wall 45 or third wall 47 omitted. Alternatively, the first and/or second body may comprise a rectangular cross section formed by including a fourth wall connecting the first wall 41 and third wall 43 and/or a fourth wall connecting the first wall 45 and the third wall 47.

The sliding support assembly shown in FIG. 8 comprises an armrest 50 coupled to the second body 12. The armrest would be suitable for use in automotive vehicles. The sliding support assembly of FIG. 8 may comprise any one of the slide arrangements shown in FIGS. 9A to 9C.

The sliding support assembly may also be of use in a number of other applications including, but not limited to, fork lift truck slides, and movable vehicle steps, such as those found on taxis and buses.

In use, the sliding support assembly 10 supports a load applied to one of the first 11 or second 12 bodies whilst allowing sliding motion in the longitudinal direction LD between the first 11 and second 12 bodies. The longitudinal sliding of the sliding support assembly 10 may be controlled by a linear actuator. The linear actuator may be a gas spring, a screw drive actuator such as a ballscrew or any other suitable linear actuator. Longitudinal sliding of the sliding support assembly 10 may alternatively be controlled manually by a user applying force to one of the first 11 or second 12 bodies. Under minimal load in the lateral CD or separation SD directions the friction slide member 31 may be in light contact or not in contact at all with the friction slide channel 32 (light contact may be achieved by the biasing means or by a loose fit). In this loading condition, the user or the linear actuator benefits from the low sliding resistance of the rolling slide mechanism 20. This typically allows the sliding support mechanism to be actuated by a force which is less than the actuation force required by a sliding support assembly comprising only a friction slide mechanism. As a force is applied to the first 11 or second 12 bodies in the separation direction SD, the friction slide mechanism 30 provides support to the sliding support assembly 10. For example, if a user were to progressively apply a load to the first body 11 tending to pull the first body 11 away from the second body 12 in the separation direction SD, the friction slide mechanism 30 will progressively take up more of the load than the rolling slide mechanism 20. Loading conditions which may tend to cause the first body 11 to be pulled away from the second body 12 include any of bending, torsional or linear loads applied to the bodies. In this way, the friction slide mechanism 30 provides additional stiffness to the sliding support assembly 10.

It will be appreciated that the embodiments shown in the figures and described herein are by way of example only, and that alterations of modifications may be made within the scope of the invention as defined in the appended claims.

The sliding support assembly of the present invention is particularly well suited to a range of applications in which the sliding support assembly supports the weight of an object and is slidable in a vertical direction. In such applications, the weight of an object may be supported such that the load passes through an axis within the sliding support assembly, i.e. there is little or no flexural or bending load applied by the weight of the object. In such a case, the weight of the object, a relatively static load, is primarily supported by the actuator or any other device such as a brake which holds the sliding support assembly in position. The additional stiffness of the assembly provided by a friction slide then benefits other dynamic loads such as twisting or bending applied due to movement or inertia.

Alternatively, the weight of an object is supported by the sliding support assembly such that the load passes through an axis which is outside or off-centre from the sliding support assembly. In such a case the weight, or static, loading applies bending or torsion to the sliding support assembly and the friction slide provides stiction to the assembly. Any further dynamic loads in this case may act to increase or reduce the stiction. In any case, stiction may be a useful phenomenon since it can reduce the holding force necessary to maintain the relative vertical positions of the two bodies supported by the sliding support assembly, or it may limit the speed of the uncontrolled release of the sliding support assembly. In such a case, if the actuator no longer supports the weight of the object and the sliding support assembly uncontrollably lowers the object, then the speed of the lowering of the object is limited by the friction of the friction slide. In the case of an off-centre load, the greater the load the greater the friction that is provided by the friction slide.

The invention claimed is:

1. A sliding support assembly comprising a first body slidable relative to a second body in a longitudinal direction wherein the sliding support assembly comprises:
   a rolling slide mechanism, the rolling slide mechanism comprising:
      a rail associated with the first body, the rail defining a channel,
      a slide member associated with the second body, the slide member slidable in the longitudinal direction within the channel, and
      locating means comprising rotatable bearings configured to locate and align the slide member within the channel;
   a friction slide mechanism, the friction slide mechanism comprising:
      a friction slide member associated with the first body, and
      a friction slide channel associated with the second body, wherein the friction slide member is configured to slide in the longitudinal direction within the friction slide channel; and
      a low friction material insert shaped to flex towards a position to engage the friction slide channel and the friction slide member.

2. The sliding support assembly of claim 1, wherein the low friction material insert comprises a polymeric material and the low friction material insert is shaped to flex towards a position where the low friction material insert is in contact with the friction slide channel and the friction slide member.

3. The sliding support assembly of claim 1, further comprising a biasing member which biases the low friction material insert into contact with the friction slide channel and/or the friction slide member.

4. The sliding support assembly according to claim 1, wherein the friction slide member comprises an L-shaped cross-section.

5. The sliding support member according to claim 1, wherein the low friction material extends a portion of the length of the friction slide member and/or the friction slide channel.

6. The sliding support assembly according to claim 1, further comprising a second rolling slide mechanism, the second rolling slide mechanism comprising:
   a second rail associated with the first body, the second rail defining a second channel,
   a second slide member associated with the second body, the second slide member slidable in the longitudinal direction within the second channel, and
   second locating means comprising second rotatable bearings configured to locate and align the second slide member within the second channel.

7. The sliding support assembly of claim 6, wherein
   at least one of the plurality of rolling slide mechanisms is arranged in a first plane, and
   at least one of the plurality of rolling slide mechanisms is arranged in a second plane.

8. The sliding support assembly of claim 7, wherein the first plane is perpendicular to the second plane.

9. The sliding support assembly according to claim 1, wherein the sliding support assembly further comprises a second friction slide mechanism the second friction slide mechanism comprising:
   a second friction slide member associated with one of the first body or the second body, and
   a second friction slide channel associated with the other of the first or second body, wherein the second friction slide member is configured to slide in the longitudinal direction within the second friction slide channel.

10. The sliding support assembly of claim 1, wherein the first body and/or the second body comprises an L-shaped, a U-shaped, or a rectangular shaped cross section.

11. The sliding support assembly of claim 1, wherein the sliding support assembly is configured to support an armrest.

12. The sliding support assembly of claim 1, wherein the friction slide mechanism is arranged within the rail of the rolling slide mechanism.

13. The sliding support assembly of claim 12, wherein the friction slide mechanism is a first friction slide mechanism and the sliding support assembly further comprises a second friction slide mechanism arranged within the rail of the rolling slide mechanism.

14. The sliding support assembly of claim 13, wherein the first friction slide member extends transverse to the longitudinal direction and the second friction slide member extends laterally opposed to the first friction slide member.

15. The sliding support assembly of claim 1, wherein the longitudinal direction is vertical.

16. An armrest comprising the sliding support assembly of claim 1.

17. A forklift comprising the sliding support assembly of claim 1.

* * * * *